United States Patent [19]

Milner et al.

[11] Patent Number: 5,276,909
[45] Date of Patent: Jan. 4, 1994

[54] TRAFFIC INFORMATION BROADCAST SYSTEM

[75] Inventors: Ronald E. Milner, Grass Valley; Laurence R. Nicholson, Nevada City; Robert Evans, Palo Alto, all of Calif.

[73] Assignee: Autotalk, Inc., Grass Valley, Calif.

[21] Appl. No.: 720,596

[22] Filed: Jun. 25, 1991

[51] Int. Cl.$^5$ .................... H04B 7/00; H04Q 3/02
[52] U.S. Cl. .................... 455/38.5; 455/45; 455/142; 455/158.3; 455/186.1; 455/228; 455/345; 381/3
[58] Field of Search .............. 455/3, 38, 134, 228, 455/345, 221, 70, 158, 45, 38.5, 345, 142, 186.1, 67.1; 381/3, 4, 14

[56] References Cited

U.S. PATENT DOCUMENTS

| | | | |
|---|---|---|---|
| 2,959,644 | 11/1960 | Grace | 455/142 |
| 3,135,922 | 6/1964 | Eland | 455/142 |
| 3,729,581 | 4/1973 | Anderson | 379/105 |
| 3,774,114 | 11/1973 | Dahlgren | 455/38.5 |
| 3,860,913 | 1/1975 | Weeks, Jr. et al. | 340/825.65 |
| 3,919,479 | 11/1975 | Moon et al. | 455/67.1 |
| 3,949,401 | 4/1976 | Hegeler et al. | 455/38 |
| 4,019,142 | 4/1977 | Wygoff | 455/38 |
| 4,031,467 | 6/1977 | Singleton, Jr. et al. | 455/33 |
| 4,112,377 | 9/1978 | Tanner et al. | 455/142 |
| 4,127,852 | 11/1978 | Preston et al. | 455/31 |
| 4,305,101 | 12/1981 | Yarbrough et al. | 358/908 |
| 4,369,443 | 1/1983 | Giallanza et al. | 455/38 |
| 4,380,821 | 4/1983 | Eckhardt | 455/38 |
| 4,435,845 | 3/1984 | Timm et al. | 455/345 |
| 4,575,750 | 3/1986 | Callahan | 455/4 |
| 4,584,708 | 4/1986 | Eilers et al. | 455/70 |
| 4,627,101 | 12/1986 | Anderson et al. | 455/221 |
| 4,663,765 | 5/1987 | Sutphin et al. | 455/38 |
| 4,677,466 | 6/1987 | Lert, Jr. et al. | 455/67.1 |
| 4,862,513 | 8/1989 | Bragas | 455/345 |
| 4,969,209 | 11/1990 | Schwob | 455/158 |
| 5,020,143 | 5/1991 | Duckeck et al. | 455/345 |
| 5,095,532 | 3/1992 | Mardus | 455/345 |
| 5,119,507 | 6/1992 | Mankovitz | 455/186.1 |

OTHER PUBLICATIONS

Orr, William I., Radio Handbook, 1956 pp. 441, 447-448 by Editors and Engineers of Summerland, Calif.

Primary Examiner—Reinhard J. Eisenzopf
Assistant Examiner—Timothy H. Keough
Attorney, Agent, or Firm—Michael L. Sherrard

[57] ABSTRACT

A broadcast and reception system provides a segmented broadcast signal for providing regional traffic information and a receiver adapted to receive selected segments of that broadcast. The segmented broadcast signal includes a number of segments which each include a tone sequence, a digital regional code, a digital duration code, and an audio segment. The receiver monitors selected regional traffic segments and converts the selected audio segment to a form compatible with a standard automotive radio. Thus, a user can selectively monitor regional traffic information without having to listen to reports from regions of no interest to him. Alternatively, the selected traffic information can automatically override normal radio listening.

18 Claims, 6 Drawing Sheets

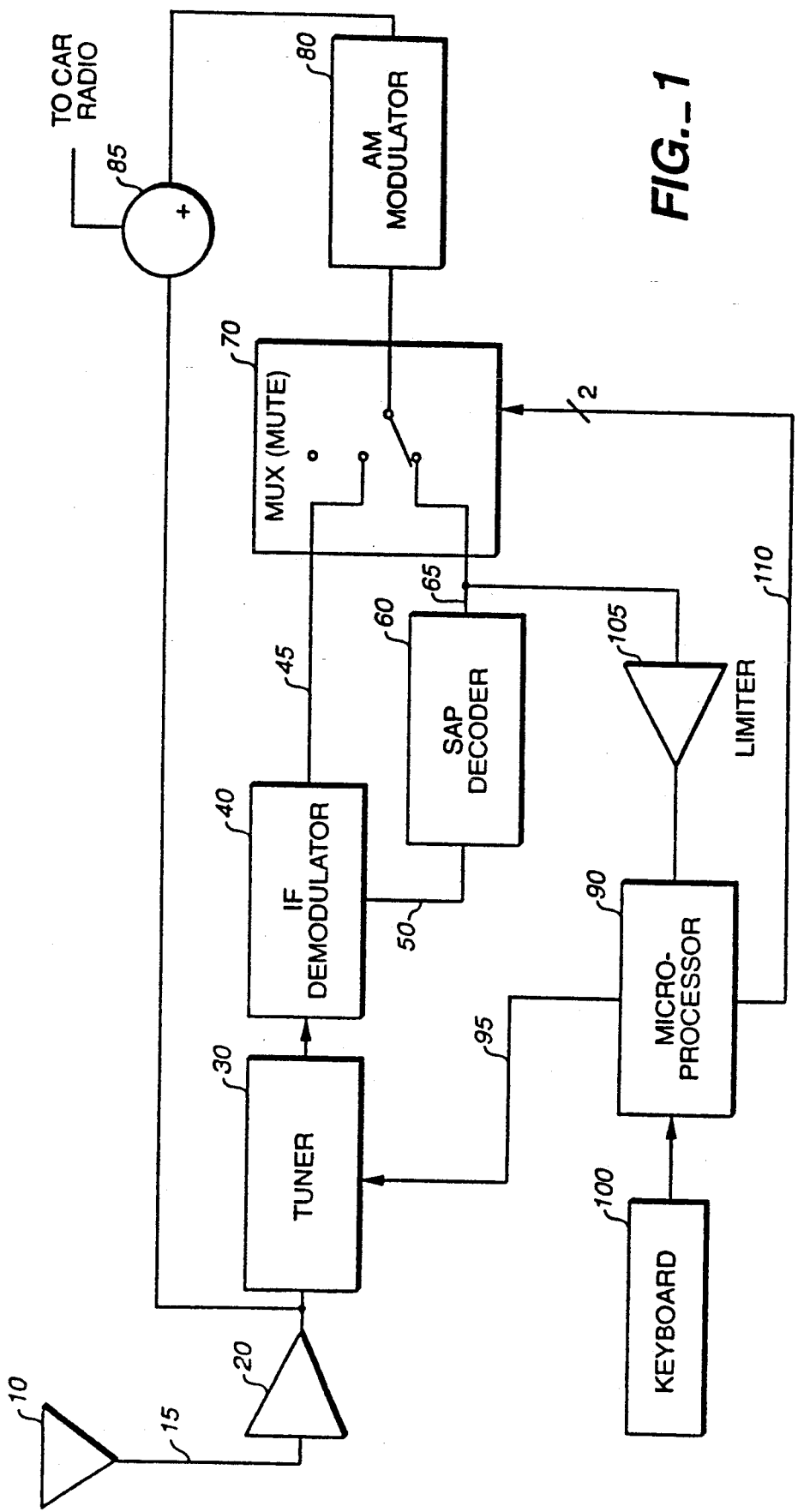
FIG._1

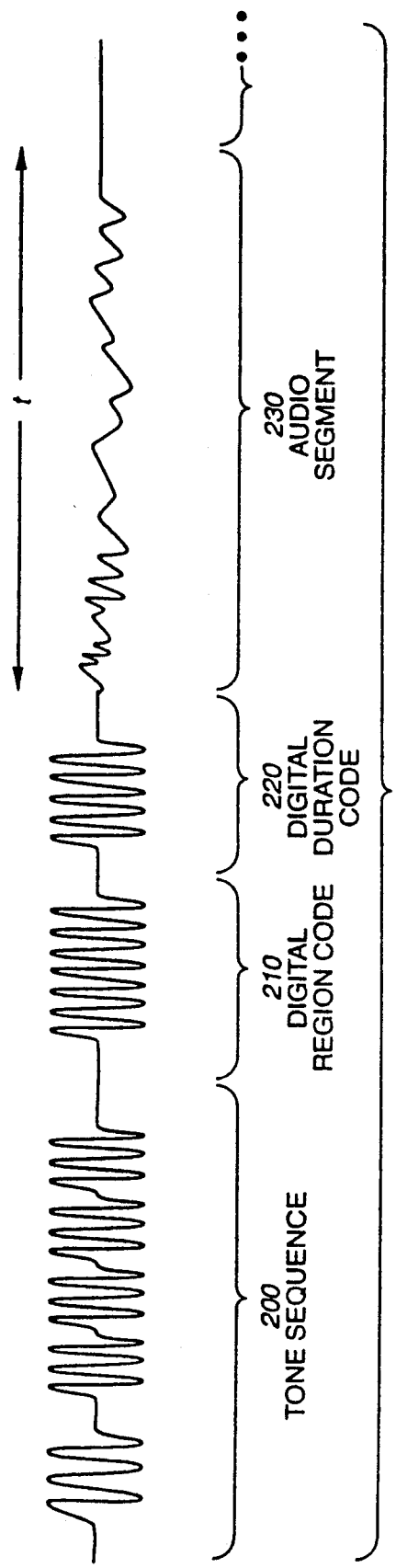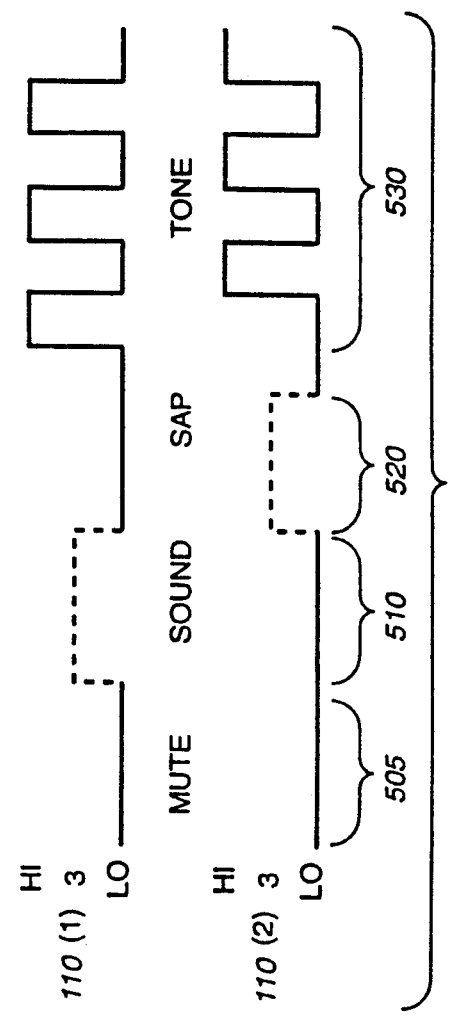

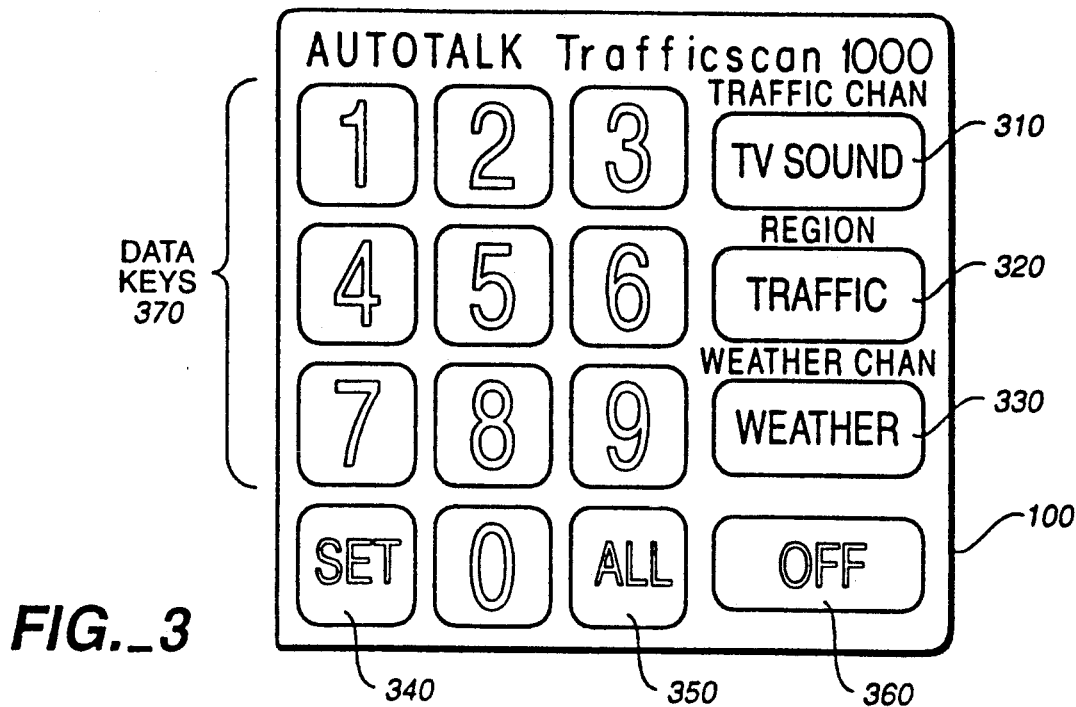
FIG._3
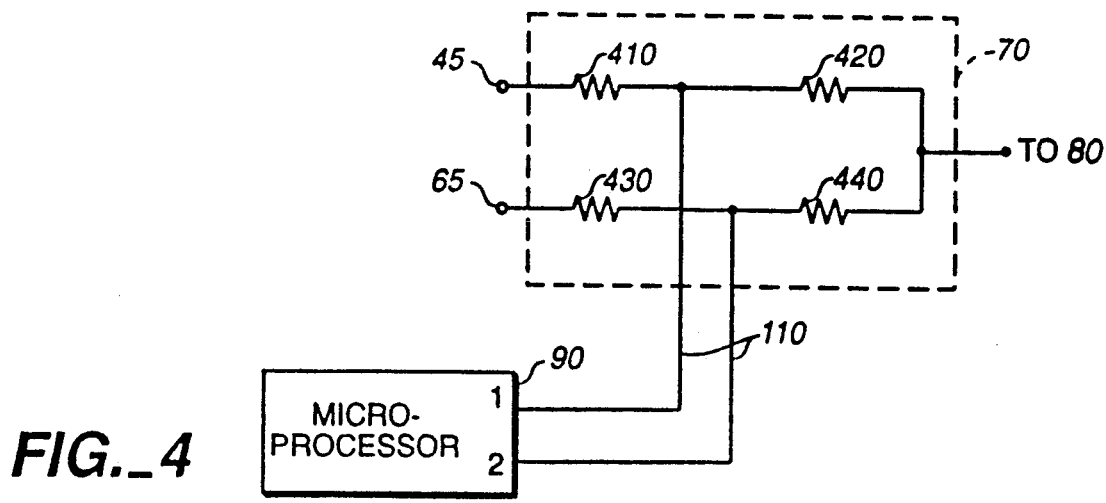
FIG._4

| | | |
|---|---|---|
| RESET: | IF RAM IS INVALID CLEAR RAM AND LIMIT VALUES | 601 |
| MAIN: | IN TRAFFIC MODE? IF NO, PROCESS TIMERS | 602 |
| | IS TALK-TIMER DONE? IF NO, PROCESS TIMERS | 603 |
| | (YES) READ INPUT FOR NEXT FREQUENCY IN KEY SEQUENCE | 604 |
| | FREQUENCY PRESENT? IF YES GO TO FRQ PRS | 605 |
| | (NO) CORRECT FREQUENCY | 606 |
| | FIRST TONE RECIEVED? IF NO, PROCESS TIMERS | 607 |
| | (YES) ANY ERRORS ALREADY? IF YES DO TIMERS | 608 |
| | (NO) FLAG ONE ERROR | 609 |
| FRQ PRS: | DELAY TO NEXT NOTE IN SEQUENCE | 610 |
| | COUNT SEQUENCE OF NOTES. IF NOT DONE, GO TO MAIN | 611 |
| | (DONE) TURN OFF AUDIO, SET DATA TONE COUNTER=8 | 612 |
| NXT TONE: | GET NEXT DATA TONE (ALWAYS SET TO 658HZ) | 613 |
| | 658 HZ? IF YES DATA="00" AND GO TO SHIFT | 614 |
| | 550 HZ? IF YES DATA="11" AND GO TO SHIFT | 615 |
| | 493 HZ? IF YES DATA="01" AND GO TO SHIFT | 616 |
| | (NO) 415 HZ. DATA="10" | 617 |
| SHIFT | SHIFT DATA IN TO 16 BIT VALUE DELAY | 618 |
| | DELAY TO NEXT TONE | 619 |
| | GO TO NXT TONE | 620 |

FIG._6

| | | |
|---|---|---|
| | DO A KEY SCAN TO CHECK FOR ANY KEYS. IF YES ABORT. | 701 |
| | (NO) SET UP VARIOUS PARAMETERS FROM TABLE ACCORDING TO SEQUENCE COUNT (SET FOR DETECTING A SINGLE FREQUENCY +/-4%) | 702 |
| LOOP: | VARIOUS EQUALIZING WAITS TO MAINTAIN A 100 USEC LOOP TIME | 703 |
| | INCREMENT CYCLE TIME COUNTER (100 USEC STEPS) | 705 |
| | SAMPLE AUDIO INPUT AND SHIFT INTO CELL | 706 |
| | SEE IF A LEGITAMATE POSITIVE TRANSITION HAS OCCURRED OF "0011" IF NO GO TO LOOP | 707 |
| | (YES) ARE TWO BITS BEYOND TRANSITION REASONABLE? ALLOW MAX 1 BIT ANOMALIE. IF 10001111 OR 01001111 OK IF NO GO TO LOOP | 708 |
| | IS CYCLE TIME COUNT IN RANGE FOR FREQUENCY? IF YES, GO TO ADD CT | 709 |
| | (NO) RESET CYCLE TIME COUNT | 710 |
| | COUNT ERRORS | 711 |
| | TOO MANY ERRORS? IF NO GO TO LOOP | 712 |
| | (YES) GO TO ERROR EXIT | 713 |
| ADD CT: | ADD CYCLE TIME VALUE TO ACCUMULATED SUM | 714 |
| | DECREMENT ERROR COUNT (TO ZERO) | 715 |
| | RESET CYCLE TIME COUNTER | 716 |
| | COUNT GOOD CYCLES | 717 |
| | DONE WITH ALL EIGHT CYCLES? IF NO, GO TO LOOP | 718 |
| | (YES) IS AVERAGE SUM IN RANGE FOR 8 CYCLES OF GIVEN FREQUENCY? IF NO, GO TO ERROR EXIT | 719 |
| | (YES) NORMAL EXIT | |
| | (YES) | |

FIG. _7

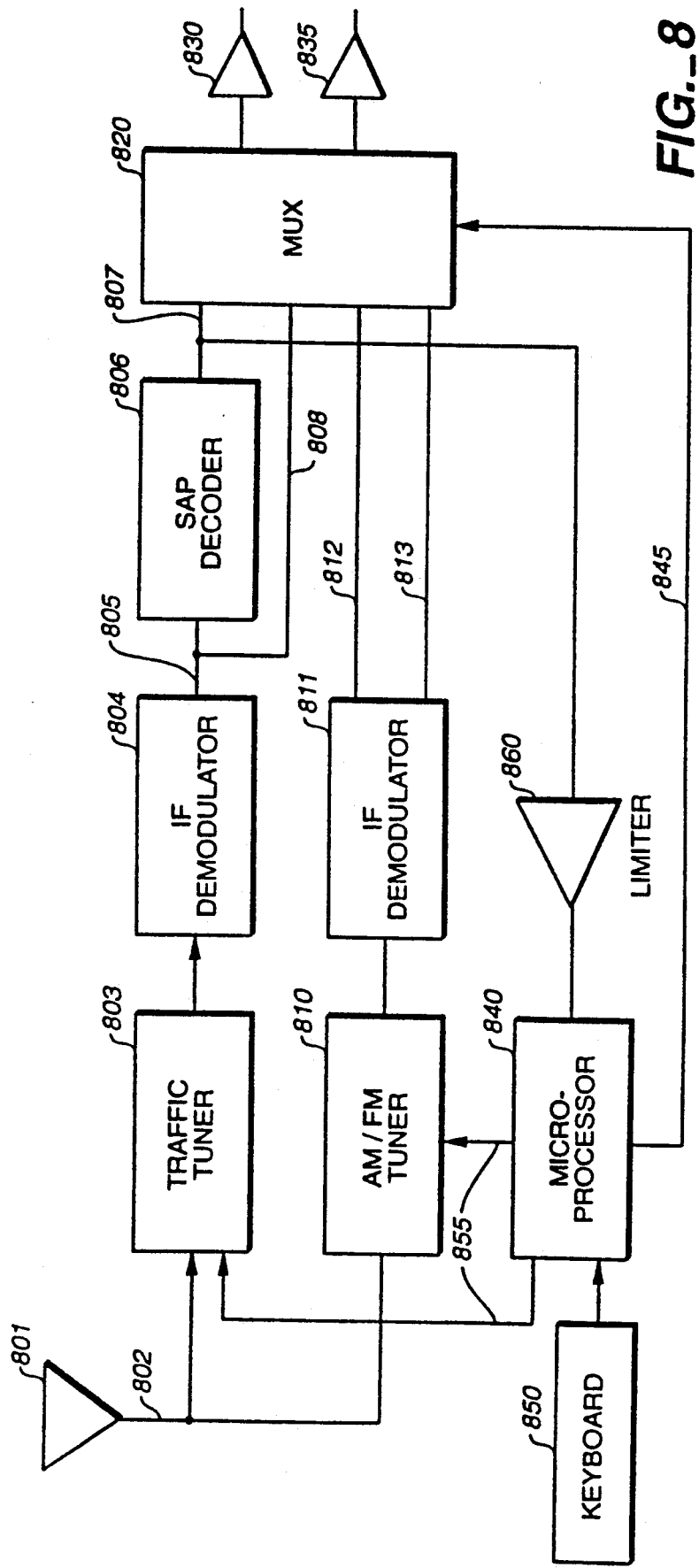
FIG._8

TRAFFIC INFORMATION BROADCAST SYSTEM

BACKGROUND OF THE INVENTION

1. Field

The present invention relates to the field of radio and television broadcasts and reception. More specifically, the present invention relates to a segmented broadcast signal format for traffic information and an automotive receiver adapted to selectively receive regional segments of that traffic broadcast. The present invention further provides for the conversion of selected SAP television signals to a form compatible with the input of a standard automotive radio and an integrated tuner that provides for automatic monitoring of the segmented traffic broadcast signal while otherwise providing normal radio listening.

2. Art Background

The insertion of control tones into radio and television broadcasts is well known. For example, U.S. Pat. No. 3,729,581 titled Computer Assisted Dial Access Video Retrieval for an Instructional Television System, issued to Deyrol E. Anderson, Apr. 24, 1973, describes a computer-assisted dial-access video-retrieval system. This system responds to tone commands received by telephone and broadcasts requested video information via a TV transmitter link and controls a subscriber's video tape recorder by control tones inserted into the broadcast signal. The requesting subscriber is individually addressed by a broadcast code consisting of a predetermined three variable (tone, duration, and period of silence) code. This code selectively activates the subscriber's video tape recorder, and the requested materials are then transmitted via the TV transmitter link. The transmission is followed by a reset tone which deactivates the subscriber's tape recorder.

However, systems such as this require the use of an elaborate decoders which constantly monitor audio programs to detect codes comprised of unique tone burst sequences. Such decoders must discriminate tones from random audio tones. Thus, the code sequence must be complex enough to preclude the possibility of duplication by music, speech, or any other program audio normally encountered. At the same time, the code sequence and decoder must be simple and reliable.

Early decoders used separate and distinct bandpass filters for each different frequency of interest. An improved tone sequence and decoder architecture was taught in U.S. Pat. No. 3,860,913, titled "Multifrequency Sequential Tone Decoder, issued to Weeks, Jr. and Wohnoutka, Jan. 14, 1975. This patent describes turning on and off various automated systems in response to control signaling utilizing audio tones in a broadcast medium such as a standard radio or TV audio transmission. Specifically, the patent teaches the use of active, high-Q semiconductor tunable-bandpass filters. This permits a single switchable active-filter to be responsive to different frequencies in accordance with a timed code. This is used in combination with a code that includes tones that are transmitted for a predetermined length of time, each followed by a silence of a predetermined length of time. The decoder then verifies the frequencies, the duration of each tone, a period of silence, and the duration of silence.

Another system using broadcast tone control signals is taught in U.S. Pat. No. 4,031,467, titled Alerting Process and System of Apparatus Therefor, issued to Singleton, Jr., and Whitney Jun. 21, 1977. This patent teaches a tornado warning system which includes a number of receivers pretuned to the same frequency. The receivers can be selectively activated by the use of selective triggering frequencies superimposed on the carrier frequency. Thus, only the desired receivers hear the broadcast audio message. The receivers include a timer that enables reception for a preselected time interval.

A similar addressing system is taught in U.S. Pat. No. 4,127,852, issued to Preston and Barton Nov. 28, 1978. This patent teaches a power use alarm signal broadcast over a AM or FM carrier. Remote sites are equipped with a pre-tuned AM or FM receiver which can be addressed by a fixed sequence of audio tones. The receiver turns on for a preselected period of time in response to its individual "address" of audio tones and causes lights to blink, couples an alarm message to a public address system, and automatically turns off nonessential electronic equipment.

Another addressing system is taught in U.S. Pat. No. 4,575,750, titled Communication Apparatus for use with Cable Television Systems issued to Callahan Mar. 11, 1986. This patent provides emergency audio messages on a cable carrier for users such as volunteer fireman. The transmission unit orginates messages and message class identification signals. Receivers continuously monitor the in-coming signals for a preselected trigger signal. The receiver renders the emergency messages audible when it identifies it as being authorized for that unit. A timer then enables reception for a pre-selected period of time, ar alternatively a termination signal disables reception. An override switch allows any broadcast to be rendered audible, and a manual termination switch is provided on the receiver.

These systems are addressing systems. A new type of system, which permits the selective reception of desired broadcast information is taught by U.S. Pat. No. 4,305,101, issued to Yarbrough, Stachan and Weisman Dec. 8, 1981. This patent teaches the selective reception and recording of broadcast audio/video in response to broadcast tone codes matching tone codes in a pre-stored list of orders. Broadcast signals are encoded with information which identifies segments to follow. The broadcast is continuously monitored for these encoded signals, which are then compared with pre-stored codes. Action is then taken in response to the received codes, such as receiving, recording or disabling recording.

However, it is desirable to provide a system of transmitting and receiving regional traffic reports that permits the decoding of traffic reports selected by a user while not requiring his listening to reports from areas of no interest to him. It is also desirable for the user to be able to listen to these reports over his automobile radio. It is further desirable to have selected traffic reports automatically switch into regular listening of the automobile radio.

SUMMARY OF THE INVENTION

A broadcast and reception system in accordance with the preferred embodiment of the invention provides a segmented broadcast signal and a receiver adapted to receive selected segments of that broadcast. The segmented broadcast signal is preferably broadcast on the SAP carrier of a commercial TV station. Each segment includes a tone sequence, a digital regional code, a digital duration code, and an analog audio segment. The receiver selectively monitors the audio segments in response to the digital regional codes and converts the audio segment to a form compatible with a standard automotive radio. In an alternative embodiment an integrated tuner provides for the automatic switching between regular radio listening and the selected audio segments of the segmented broadcast signal.

The preferred embodiment thus allows a user to receive selected audio segments of a specially formatted television broadcast signal on his car radio. Thus a large range of information can be made available to a user, from which the user can selectively choose which segments of the information he desires to hear. The system permits this information to be updated on a regular basis at the broadcast facility, and allows the user to monitor the portions of the broadcast that he desires through his car radio. In an alternative embodiment selected audio segments automatically override regular music on the automobile radio, allowing the listener to listen to normal music broadcasts when the selected audio segment is not being broadcast. These and other advantages and features of the invention will become readily apparent to those skilled in the art after reading the following detailed description of the preferred embodiment of the present invention and studying the accompanying drawings.

BRIEF DESCRIPTION OF THE DRAWINGS

FIG. 1 is a block diagram of a receiver according to the preferred embodiment of the present invention.

FIG. 2 is an illustration of the waveform of the specially formatted broadcast signal in accordance with the preferred embodiment of the present invention.

FIG. 3 is an illustration of keyboard 100.

FIG. 4 is a schematic diagram of multiplexer 70.

FIG. 5 is an illustration of the waveforms of the control signals on audio control lines 110 (1) and 110 (2).

FIG. 6 is a block diagram of the logic flow of the software detection logic that detects the tone sequence, the digital region code, and the digital duration code.

FIG. 7 is a block diagram of the logic flow of the frequency detection subroutine.

FIG. 8 is a block diagram of an integrated AM/FM and traffic tuner.

DETAILED DESCRIPTION OF THE PREFERRED EMBODIMENT

Receiver block diagram:

FIG. 1 is a block diagram of a receiver according to the preferred embodiment of the present invention. The receiver is designed to be coupled between a conventional car antenna and an existing car radio in an automobile. Specifically, the receiver is coupled to car antenna 10 via coax cable 15. The signal from car antenna 10 is coupled to and amplified by a wide-band amplifier 20. The amplified signal from amplifier 20 is coupled to VHF/UHF/WEATHER tuner 30. Tuner 30 is a conventional tuner of the type available from Samsung as part number EBC-1731AL coupled to a frequency lock controller chip such as a Phillips TSA5511. This tuner can tune television signals on VHF and UHF bands and can also tune National Weather Channels. Thus, it can provide the sound from either normal TV broadcast or the National Weather Channels.

Turner 30 provides an output signal on an intermediate frequency (IF) carrier of 47.5 Mhz. An IF demodulator 40 demodulates the intermediate frequency and provides an audio output on audio line 45. In the preferred embodiment, this will be the audio channel of a TV broadcast or the audio from one of the National Weather Service broadcasts. IF demodulator 40 also provides a wideband output on line 50, which has a bandwidth sufficient for the SAP (secondary audio program) signal. Line 50 is coupled to SAP decoder 60, which demodulates the 78 khz SAP subcarrier on the audio signal to provide an audio signal on line 65 for the SAP channel.

The audio signals on lines 45 and 65 are selectively coupled by a multiplexer 70 to an AM modulator 80 in response to control signals from a microprocessor 90. The control signals are coupled via audio control lines 110. Multiplexer 70 couples the selected audio signal to AM modulator 80 which modulates a 530 khz carrier with the selected audio signal. The resulting AM signal is combined with the amplified signal from amplifier 20 in adder 85 and coupled to the AM radio in the car.

Microprocessor 90 is a 68HC05J1 available from Motorola. Microprocessor 90 is coupled to a keypad 100 to receive user input commands, including commands to select channels. Microprocessor 90 is further coupled to tuner 30 via an I$^2$C interface bus 95 to control the operation of tuner 30. The I$^2$C interface bus protocol is a serial tuner interface which conforms to the Signetics/Phillips "I-squared C" serial bus specification. Microprocessor 90 is also coupled via a limiter 105 to receive the audio output from SAP decoder 60. Limiter 105 operates to convert the audio output from SAP decoder 60 to digital logic levels compatible with the microprocessor inputs in a conventional manner.

In operation, specially formatted regional traffic signals are broadcast on TV SAP carriers. The receivers selectively receives this broadcast, demodulates the audio signal, AM modulates a 530 khz carrier with the signal, and couples the modulated carrier to the car radio antenna input. Thus, the car radio is coupled to the car antenna in a conventional manner, however, the selected regional traffic information is also provided to the car radio antenna input on a 530 khz carrier. Thus, by tuning the car radio to 530 khz, the user can selectively monitor regional traffic broadcasts of this choice in response to keyboard commands.

The broadcast sequence:

The receiver in accordance with the preferred embodiment of the present invention is adapted to selectively monitor specific broadcast segments of a specially formatted broadcast signal. This broadcast signal is preferably broadcast on a SAP subcarrier of a TV station channel and is made of a number of segments. Each segment includes certain logical information and an audio portion, as is illustrated by the waveform of FIG. 2.

The first portion of each broadcast segment consists of a predefined tone sequence 200. Tone sequence 200 synchronizes the broadcast with the receiver detection circuitry and identifies the signal as being a specially formatted broadcast signal of the type compatible with the receiver. The second portion of the broadcast segment consists of a digital region code 210. Digital region code 210 comprises eight (8) bits of FSK (frequency shift keying) digital information which identifies the following audio segment for the purpose of selection. The third portion of the broadcast segment consists of a digital duration code 220. Digital duration code 220 comprises eight (8) bits of FSK digital information which defines the duration of the following audio segment.

More specifically, tone sequence 200 is a five (5) note sequence. The five notes are each characterized by a frequency, a duration, and a time between notes. The five note musical sequence of the preferred embodiment is described below in Table 1.

TABLE 1

| | Note | Freq | Duration | Time from start of note to start of next note |
|---|---|---|---|---|
| 1. | E3 | 329 hz | 76 ms | 120 ms |
| 2. | B4 | 493 hz | 73 ms | 104 ms |
| 3. | E4 | 658 hz | 108 ms | 200 ms |
| 4. | G#3 | 415 hz | 74 ms | 105 ms |
| 5. | C#4 | 550 hz | 135 ms | 138 ms (time to data) |

Tone Sequence 200

Digital region code 210 has an integer value of 0–127. In the preferred embodiment, the value of this code identifies the following audio segment and permits the selective reception of desired audio segments, such as those corresponding to specific regions or highways. The protocol provided in Table 2, which is adapted for the broadcast of traffic information, has been implemented in the preferred embodiment. In general, the receiver always monitors audio segments identified by a "0" digital region code. Regions 1–80 can be selectively monitored in response to user commands. Alternatively, regions 1–80 can all be monitored by the use of an "ALL REGIONS" command. Regions 81–127 are designated as "special regions" and are provided for special users. Special regions segments are not monitored in response to the "ALL REGIONS" command. Instead, they are selected only by individual selection These special regions channels are of interest to special users such as delivery trucks, taxi cabs, etc.

TABLE 2

| Digital region code value | Definition and usage |
|---|---|
| 0 | "Report All Regions" used for emergency broadcasts or general annoucements |
| 1–80 | "Regular Regions" used for regional traffic information broadcasts |
| 81–127 | "Special Regions" used for providing special purpose broadcasts |

Digital Region Code 210

Digital duration code 220 comprises eight (8) bits of FSK digital information which defines the duration of the following audio segment. The duration is measured from the end of digital duration code 220 to the end of the following audio segment 230. The value is in multiples of 245.76 ms steps, providing a maximum duration code value of 62.6688 seconds (255×245.76 ms).

The duration information is used for disabling tone sequence detection during audio segment 230 and for muting the output during subsequent tone sequences 230 and digital signals. More specifically, the unique nature of tone sequence 200 should allow the receiver to differentiate speech and commercial audio from tone sequence 200. However, to further reduce the chances of an erroneous tone sequence detection, no tone sequence detection is performed during the time programmed for audio segments 230. Further, after the detection of tone sequence 200, subsequent digital codes and tone sequences are muted so that subsequent tone sequences and digital codes are not heard. This muting makes the audio received by a listener more pleasing by muting repetitive tone sequences. However, if no tone sequence is detected within 4 seconds, the audio is switched back on. This feature is useful in areas of marginal reception, as it allows monitoring of the audio information even when the tone sequences are not detectable. Thus, with normal reception, the user will only hear the first tone sequence. Thereafter, he will only hear the audio segments selected.

A digital duration code 220 of "0" is treated as a special case. Specifically, a digital duration code 220 of "0" causes the audio to be gated according to the value of digital region code 210 and immediately activates the scanning for a tone sequence 230. If the audio is gated on in response to a digital region code 210, the audio will stay on until a tone sequence 200 is detected, regardless of time. This allows for live broadcasts without a limitation on the duration of the audio segment. This feature is especially useful when used in conjunction with the "ALL REGIONS" code ("0"), as it permits the broad dissemination of emergency information or general interest announcements.

The final portion of the broadcast signal is an audio segment 230. This is an analog audio signal which typically describes traffic conditions for the region identified by the preceding digital region code 210. Audio segment 230 typically has a duration defined by the preceding digital duration code 220.

Software Commands:

The software controlling the operation of microprocessor 90 is contained in a ROM embedded within the 68HC05J1 microprocessor 90. In general, the software allows for tuning of TV, SAP, and weather channels. It also contains logic to gate only selected segments of the specially formatted broadcast signal in response to tone sequences 200 and the other digital information contained in the specially formatted broadcast signal.

In general, data values and commands are entered via 16 position keyboard 100, illustrated in further detail in FIG. 3. Data values for channel selection are entered as one of two decimal digits using the data entry keys "0"–"9". The entry of specific commands is also provided by keyboard 100. The usual command and data entry sequence is: 1) Entry of a data value; 2) "SET" key 340; and 3) Entry of a command. This entry sequence records the entered data value as a preset and selects the operation indicated by the command. Alternatively, a preset channel may be selected by pressing the selected command key. Similarly, a channel can be selected without recording it as a preset by pressing the data value for the desired channel followed by the command key. The specific tuning functions can be selected by the command keys "TV SOUND" 310, "WEATHER" 320, and "TRAFFIC" 330 as described below.

TV SOUND: Normal TV sound can be monitored by entering a one or two digit channel number (keys "0"–"9") and then pressing the "TV SOUND" command key 310. Pressing "TV SOUND" command key 310 again will alternately select the SAP (Second Audio Program) or the normal audio channel for the selected TV channel. No traffic region decoding occurs in this mode, even if the selected channel contains tone sequences 200 or other digital information. Also, the "SET" key 340 has no effect in this mode.

WEATHER: The receiver can monitor any one of the three National Weather Service channels by entering "1", "2", or "3" as the channel number followed by "WEATHER" command key 330. Alternatively, pressing the "WEATHER" command 330 key selects the default weather channel. The default weather channel is preprogrammed to channel #1 (162.40 Mhz). The default weather channel may be changed by entering "1", "2", or "3" as the channel number followed "SET" key 340 and "WEATHER" command key 330.

TRAFFIC: The "TRAFFIC" function is used to selectively monitor audio segments broadcast in accordance with the present invention, such as segments of the traffic report describing the traffic for a specific region or highway of interest to the user. The receiver can be programmed to monitor up to four selected segments by entering a data value for the region code, "SET" key 340, and then pressing the "TRAFFIC" command key 320. The last four entries are retained in a selection stack. Alternatively, the "ALL" key 350 followed by pressing the "TRAFFIC" command key 320 permits monitoring of all normal segments. When entered, "ALL" key 350 erases all previous region code selections. A subsequent region code selection will overwrite the "ALL" command and be the only region code on the region code selection stack.

Any key sequence ending with the "TRAFFIC" command key 320 will result in the monitoring of the selected traffic segments on the selected SAP channel. The receiver will then turn on the SAP audio of the selected channel and activate the detection of tone sequences and digital codes as described in detail below to detect the selected audio traffic reports and to provide those reports through the car radio.

OFF: Pressing the off key 360 turns off the tuner section of the receiver electronics and runs the microprocessor back through some of its initialization. The microprocessor then continues to operate with audio disabled, scanning the keys. The power control output on the microprocessor turns off most of the receiver circuitry to avoid draining the car battery when the tuner is off. The microprocessor also maintains a timer that performs the same function after about two hours of no keyboard activity.

Tone sequence and digital code detection:

In operation, when microprocessor 90 is placed in the "TRAFFIC" monitor mode it searches the data received from limiter 105 for the first frequency in tone sequence 200 (see Table 1). Once the first frequency is found, the second is searched for at the fixed time. Once four out of the five tones have been detected, the digital region code 210 and digital duration code 220 are read. Failure to read four out of five tones resets the search to the first tone and the search starts over. Both timing and frequency must be correct. Frequencies are detected to within +/−4%. Tone spacing is important to the sequence. Tone duration is only important to the extent that the tone lasts long enough to be detected and to fall within the window when the microprocessor is looking for it. To avoid sampling the wrong frequency, a silence of at least 25 ms is recommended between broadcast tones.

The FSK digital region code 10 and digital duration code 220 are data sequences of eight sine-waveform tones lasting 81.92 ms each with no silence between tones. The amplitude should be about the same level as tone sequence 200. One of four frequencies is used for each data tone, representing two binary bits of information. The most significant bit (MSD) bit is sent first. The data is represented as defined in Table 3:

00=658 hz
01=493 hz
10=415 hz
11=550 hz

TABLE 3

Digital Code FSK Definitions

The first, or MSB of digital region code 210 is a parity bit for both digital region code 210 and digital duration code 220. It is the inverse modulo 1 sum of the data bits (odd parity) so that the sum of all the "1" bits (including the parity bit) is an odd number. For example, "10101000 00000000" and "00000000 00000111" are correct, but "10000000 00000111" is not. If the parity detected is not an odd number, an error has occurred and the audio is turned on until another tone sequence is completed and the data is valid.

The next seven (7) bits are the digital region code 210 (in hex) for the audio segment following, followed by eight (8) bits if digital duration code 220.

The Audio Control Lines and Multiplexer Operation:

Two audio control lines 110 coupled between microprocessor 90 and multiplexer 70 gate the audio from IF demodulator 40 and SAP decoder 65 to AM modulator 80. These lines are illustrated in FIG. 1, and are shown in more detail in FIG. 4. The waveforms of the control signals on audio control lines 110 (1) and 110 (2) are illustrated in FIG. 5. Referring to FIGS. 4 and 5, microprocessor 90 can hold the control signals on audio control lines 110 in one of three states: 1) Digital ground (low state); 2) Floating (tri-state); or 3) Digital high. Audio control line 110 (1) is coupled to a resistive mixer including 5 k resistor 410 and 100 k resistor 420. Grounding audio control line 110 (1) blocks any signal on audio signal line 45 as illustrated by portions 505 and 520 of FIG. 5. Alternatively, floating the signal on audio control line 110 (1) couples the audio signal on audio line 45 to AM modulator 85 as illustrated in portion 510 of FIG. 5. Similarly, audio control line 110 (2) is coupled to a resistive mixer including 5 k resistor 430 and 120 k resistor 440 to either ground the audio signal on line 65 (as illustrated in portions 505 and 510 of FIG. 5) or by coupling it to AM modulator 85 by floating the signal on audio control line 110 (2) (as illustrated in portion 510 of FIG. 5).

The microprocessor 90 and multiplexer 70 also are adapted to generate a "beep" each time a keypad entry is made. This is accomplished by alternately toggling the signals on audio control lines 110 (1) and 110 (2) to full digital high and to ground as illustrated in signal portion 530 of FIG. 5 at a frequency of about 2 khz. The amplitude of the "beep" is proportional to the difference between the resistors 420 and 440 in multiplexer 70. The amplitude of the generated beep is preferably set to match the normal audio levels of 45 and 65. The "beep" and multiplexing functions are thus provided with minimal component cost.

Detailed Software Flow Description

FIG. 6 is a block diagram of the logic flow of the software detection logic that detects tone sequence 200, digital region code 210 and digital duration code 220. Once the traffic mode is entered and any audio segment 230 has ended, the tone sequence detection starts. Each tone in tone sequence 200 is searched for in order, and provision is made for the dropout of one tone. After tone sequence 200 is detected each of the eight data tones making up digital region code 210 and digital duration code 220 are detected.

More specifically, referring to FIG. 6, data parameters are reset in step 601, such as would occur after a power on. In step 602, if the traffic mode has been selected in response to traffic button 320 (FIG. 3) the tone sequence detection logic is entered at step 603. Otherwise, the time-out timer is processed, which provides for an automatic power down after a period of inactivity.

Step 603 tests the talk-timer. The talk-timer is responsive to the detected duration codes 220 and functions to disable the detection of tone sequences during audio segments. The talk-timer also turns off the audio output during tone sequences. If the talk-timer has timed out, the tone sequence detection continues with step 604.

In step 605 the input is tested to determine if the next tone expected in the tone sequence has been detected. This is done by the frequency detection subroutine described in FIG. 7. If the expected tone is within a predefined range of the expected tone, control goes to step 610.

If the expected tone is not found, the logic of steps 606–609 provides for the allowance of the dropout of one tone in the sequence, provided that it is not the first tone. This simple noise tolerant logic first increments the frequency to be tested (step 606), and establishes the proper ranges for the various detection tests to be conducted for the next expected tone. Next a test is done to see if the failed test was for the first tone (step 607), a test is made to see if any previous tones in this sequence were not detected (step 608), and a flag is set indicating that one error has occurred in this tone sequence (step 609).

After the detection of a tone, step 610 provides a delay until the next tone is expected. Step 611 determines if all five notes in the tone sequence have been detected, and returns to step 602 if another tone is expected. If the last tone has been detected, the audio is turned off in step 612 and the data tone counter is preset to 8 to prepare for the detection of the following expected eight data tones.

Each data tone in digital region code 210 and digital duration code 220 corresponds to two data bits. These data tones are also detected using the logic described in FIG. 7. Step 613 presets the ranges for the frequency detection subroutine of FIG. 7, and the returned sum is compared to values corresponding to 658 hz, 550 hz and 493 hz in steps 614, 615 and 616. Two bits of data corresponding to the detected frequency is stored in a shift register for each tone detected, or a "10" is stored assuming a frequency of 415 hz is stored if no comparison is made. (Steps 617–618). Step 619 then delays to the next data tone, and the logic continues until all eight data tones are detected.

The frequency detection subroutine is illustrated in FIG. 7. This frequency detection is performed without the assistance of any hardware, other than conditioning of the signal to logic levels by limiter 105. The frequency detection subroutine operates to detect the presence of an expected tone by first testing for positive transitions. The time between positive transitions is measured by software in 100 usec steps. If the time between transitions is within about a 10–20% range of the value expected for the next tone, the measured time value is added to an accumulated sum until eight in-range transition periods have been accumulated. Once eight in-range transition periods have been accumulated a final test is made to see if the accumulated sum is in-range of the expected frequency. In the case of the eight data tones, a further comparison is made to determine which of the data frequencies is present. This frequency detection algorithm thus has a hierarchy of noise rejection tests which provides a noise tolerant, yet accurate, detection for the selected frequencies.

More specifically, referring to FIG. 7, the logic flow of the frequency detection subroutine is illustrated. In steps 701 and 702 keyboard 100 (FIG. 1) is scanned and the ranges are set for the cycle time limits and the accumulated sum limits based on the next expected frequency. In step 703 a delay is introduced to insure that every software loop results in a 100 usec loop time.

Step 705 increments the 100 usec counter which provides the cycle time count between positive signal transitions. Step 706 samples the audio signal from limiter 105 (FIG. 1) once every loop, and shifts the sampled value into a shift register once every 100 usec.

Steps 707 and 708 test the sampled audio signal stored in the shift register to determine whether a positive transition has occured. A first test is made in step 707 by looking for a "0011" sample sequence (at 100 usec per sample bit). If a "0011" is detected, an additional test is made in step 708 to test the two bits before and after the possible transition. One error bit is allowed in this second test. i.e. "10001111" or "01001111" are acceptable examples. If both of these tests are meet, the positive transition is accepted and the cycle time counter is compared to determine if it is within the range set for the expected frequency.

If the cycle time value is out of range, the cycle is presumed to be in error and the cycle time counter is reset in step 710 and an error counter is incremented in step 711. If a preset number of error are counted, the subroutine exits with a error flag set in step 713. Otherwise, step 712 loops back to step 703. Up to six error cycles in a row can be detected before aborting the search for the frequency specified. Each in-range cycle decrements this error count. This scheme allows for signal dropout as well as erroneous values caused by extra noise edges.

An in-range determination in step 709 branches to step 714, where the cycle time counter value is summed in an accumulated summer. The error count is decremented in step 715 and the cycle time counter is reset in step 716. Steps 717 and 718 determine whether 8 good cycles have been completed. After 8 good cycles have been detected, the accumulated sum is examined in step 719 to see if the frequency detected is within range of the expected frequency. If the accumulated sum is within about 4% of the expected frequency, a normal exit is made indicating successful detection of the expected tone.

The frequency detection subroutine thus detects each tone of the tone sequence in order. Each tone has a duration of approximately 30–60 cycles, and only 8 positive transitions separated by the correct time need to be detected to identify an expected tone. Similarly, once the tone sequence is detected, the frequency detection subroutine is used again to detect data tones. The accumulated sum is used to further distinguish tone signals from noise and to distinguish between the data frequencies to determine which data bit pair is represented. Thus a noise tolerant frequency detection scheme is provided.

Integrated radio/traffic tuner:

FIG. 8 is a block diagram of an alternative embodiment having a traffic tuner integrated with a typical automotive radio. Specifically, the radio of FIG. 8 is designed to replace a typical AM/FM radio in an automobile and to provide the additional functionality of decoding specially formatted traffic broadcasts. Specifically, the radio is coupled to car antenna 801 via coax cable 802. The signal from car antenna 801 is coupled to VHF/UHF/WEATHER tuner 803. Tuner 803 is a conventional tuner of the type available from Samsung as part number EBC-1731AL. This tuner can tune television signals on VHF and UHF bands and can also tune National Weather Channels. Thus, it can provide the sound from either normal TV broadcast or the National Weather Channels. Tuner 803 provides an output signal on an intermediate frequency (IF) carrier of 47.5 Mhz. An IF demodulator 804 demodulates the intermediate frequency provides a wideband audio output on line 805. In the preferred embodiment, this will be the audio on a channel of a TV broadcast or the audio from one of the National Weather Service broadcasts. This output has a bandwidth sufficient for the SAP (secondary audio program) signal. Line 805 is coupled to SAP decoder 806, which demodulates the 65 khz SAP subcarrier on the audio signal to provide an audio signal on line 807 for the SAP channel.

The signal from car antenna 801 is also coupled to AM/FM tuner 810. This is a tuner as currently provided for conventional car radios. Tuner 810 typically provides an output signal on an intermediate frequency (IF) carrier of 10.7 Mhz. An IF demodulator 811 demodulates the intermediate frequency and a stereo decoder provides a stereo audio output on lines 812 and 813.

The audio signals on lines 807, 808, 812 and 813 are selectively coupled by a multiplexer 820 to stereo amplifiers 830 and 835 in response to control signals from a microprocessor 840 to provide TV audio, SAP audio, or FM/AM audio. The control signals are coupled via audio control lines 845.

Microprocessor 840 is a 68HC05J1 available from Motorola. Microprocessor 840 is coupled to a keypad 850 to receive user input commands, including commands to select channels. Microprocessor 90 is further coupled to tuners 803 and 810 via an interface bus 855 to control the tuning of the tuners. Microprocessor 840 is also coupled via a limiter 860 to receive the audio output from SAP decoder 806. Limiter 860 operates to convert the audio output from SAP decoder 806 to digital logic levels compatible with the microprocessor inputs in a conventional manner.

In operation, this alternative embodiment operates much like the embodiment of FIG. 1 to decode specially formatted regional traffic signals broadcast on TV SAP carriers. The receiver selectively receives this broadcast, demodulates the audio signal, and couples the demodulated traffic signal to the radio amplifiers. However, the integration of the car and traffic tuner so that they are both under microprocessor control permits the radio to provide a mode of operation wherein the radio can be tuned to an AM or FM station while the traffic tuner 803 monitors the traffic channel. When the selected traffic segments are identified by the microprocessor in response to the decoded signals provided by SAP decoder 806 and limiter 860, the microprocessor can interrupt the output from AM/FM tuner 810 by switching the output on line 807 to the stereo amplifiers 830 and 835 via control of multiplexer 820 over control lines 845. Listening to the selected AM/FM station is reestablished at the end of the selected traffic segment. Thus, the car radio is coupled to the car antenna in a conventional manner, and the selected regional traffic information is provided without the need for any special tuning of the AM/FM tuner. Thus, by merely selecting the desired traffic segments the user can selectively monitor regional traffic broadcasts of his choice while listening to a conventional AM or FM broadcast when the selected traffic segments are not available. An additional advantage is the ability to listen to TV or SAP sound instead of AM/FM sound.

While the invention has been particularly taught and described with reference to the preferred embodiment, those versed in the art will appreciate that minor modifications in form and details may be made without departing from the spirit and scope of the invention. For instance, the radio of FIG. 8 could include a tape or CD player and multiplexer 820 could switch in traffic information over the output of the tape or CD player. Further, the audio output can be connected to conventional non-mobile audio equipment for home or office monitoring of traffic informations. Accordingly, all such modifications are embodied within the scope of this patent as properly come within my contribution to the art and are particularly pointed out by the following claims.

We claim:

1. A method of transmitting a segmented broadcast on a carrier, the segmented broadcast including a plurality of broadcast audio segments, the method including the steps of:

inserting a fixed tone sequence into the segmented broadcast prior to each broadcast audio segment, each fixed tone sequence including multiple tones, each tone broadcast for a fixed duration, with fixed durations between the tones;

inserting an identification code into the segmented broadcast after the fixed tone sequence and prior to each broadcast audio segment, the identification code identifying the following broadcast audio segment, each identification code comprising a multiple tone frequency shift keying digital code; and broadcasting each segmented broadcast on the carrier.

2. A method of transmitting a segmented broadcast as in claim 1, the method further including the step of inserting a duration code into the segmented broadcast after the fixed tone sequence and prior to each broadcast audio segment, the duration code defining the duration for which the following broadcast audio segment is to be rendered audible.

3. Apparatus for transmitting a segmented broadcast on a carrier, the segmented broadcast including a plurality of broadcast audio segments, the apparatus comprising:

means for inserting a fixed tone sequence into the segmented broadcast prior to each broadcast audio segment, each fixed tone sequence including multiple tones, each tone broadcast for a fixed duration, with fixed durations between the tones;

means for inserting an identification code into the segmented broadcast after the fixed tone sequence and prior to each broadcast audio segment, the identification code identifying the following broadcast audio segment, each identification code comprising a multiple tone frequency shift keying digital code; and means for broadcasting each segmented broadcast on the carrier.

4. Apparatus for transmitting a segmented broadcast as in claim 3, the apparatus further comprising means for inserting a duration code into the broadcast after the tone sequence and prior to each broadcast audio segment, the duration code defining the duration for which the following broadcast audio segment is to be rendered audible.

5. A method for selectively monitoring a segmented broadcast on a carrier, the segmented broadcast including a plurality of broadcast audio segments, the method comprising the steps of:

selecting a desired identification code in response to user input, the identification code identifying a particular broadcast audio segment, each identification code comprising a multiple tone frequency shift keying digital code;

monitoring the segmented broadcast for a fixed tone sequence, each fixed tone sequence including multiple tones, each tone broadcast for a fixed duration, with fixed durations between the tones;

monitoring the segmented broadcast on the carrier for the selected identification code subsequent to the detection of the fixed tone sequence; and rendering a broadcast audio segment audible after the detection of the selected identification code.

6. A method for selectively monitoring a segmented broadcast as in claim 5, further comprising the steps of: detecting a duration code subsequent to the detection of the fixed tone sequence and inactivating the detection of tone sequences for a period of time determined in response to the duration code.

7. A method for selectively monitoring a segmented broadcast as in claim 5, further comprising the steps of: detecting a predefined duration code subsequent to the detection of the tone sequence; rendering a broadcast audio segment audible after the detection of the desired identification code; and immediately monitoring the segmented broadcast for the fixed tone sequence, the broadcast audio segment remaining audible until the fixed tone sequence is detected again.

8. A method for selectively monitoring a segmented broadcast on a carrier, the segmented broadcast including a plurality of broadcast audio segments, the method comprising the steps of:

selecting a desired identification code in response to user input, the identification code identifying a particular broadcast audio segment;

monitoring the segmented broadcast on the carrier for a fixed tone sequence;

monitoring the segmented broadcast on the carrier for the selected identification code subsequent to the detection of the fixed tone sequence; and rendering a broadcast audio segment audible after the detection of the selected identification code;

wherein the step of monitoring the segmented broadcast on the carrier for a fixed tone sequence comprises monitoring the segmented broadcast on the carrier for a five tone sequence wherein each tone is characterized by a musical note commonly associated the each tone, a frequency, a duration, and a time from the start of the tone to the start of the next tone as follows:

| | Tone | Frequency | Duration | Time from start of tone to start of next tone |
|---|---|---|---|---|
| 1. | E3 | 329 hz | 76 ms | 120 ms |
| 2. | B4 | 493 hz | 73 ms | 104 ms |
| 3. | E4 | 658 hz | 108 ms | 200 ms |
| 4. | G#3 | 415 hz | 74 ms | 105 ms |
| 5. | C#4 | 550 hz | 135 ms | |

9. A method for selectively monitoring a segmented broadcast on a carrier, the segmented broadcast including a plurality of broadcast audio segments, the method comprising the steps of:

selecting a desired identification code in response to user input, the identification code identifying a particular broadcast audio segment;

monitoring the segmented broadcast on the carrier for a fixed tone sequence;

monitoring the segmented broadcast on the carrier for the selected identification code subsequent to the detection of the fixed tone sequence;

detecting a duration code subsequent to the detection of the fixed tone sequence; and rendering the subsequent broadcast audio segment audible for a period of time responsive to the duration code.

10. A method for selectively monitoring a segmented broadcast on a carrier, the segmented broadcast including a plurality of broadcast audio segments, the method comprising the steps of;

selecting a desired identification code in response to user input, the identification code identifying a particular broadcast audio segment;

monitoring the segmented broadcast on the carrier for a fixed tone sequence;

monitoring the segmented broadcast on the carrier for the selected identification code subsequent to the detection of the fixed tone sequence;

rendering a broadcast audio segment audible after the detection of the selected identification code;

detecting a duration code subsequent to the detection of the fixed tone sequence; and muting the audio broadcast after a period of time responsive to the duration code.

11. Apparatus comprising:

connector means for coupling to the antenna of an automobile;

a tuner coupled to the connector means for tuning and demodulating broadcast audio signals received by said connector means;

a modulator coupled to receive the demodulated broadcast audio signals for modulating a radio signal with the demodulated signal;

means for combining the modulated radio signal with signals received by the connector means; and means for coupling the combined signals to the antenna input of a radio.

12. Apparatus as in claim 11 wherein the tuner demodulates the audio on a SAP carrier of a TV broadcast.

13. Apparatus comprising:

connector means for coupling to the antenna of an automobile;

a tuner coupled to the connector means for tuning and demodulating broadcast audio signals received by said connector means;

a modulator coupled to receive the demodulated broadcast audio signals for modulating a radio signal with the demodulated signal;

means for combining the modulated radio signal with signals received by the connector means; and means for coupling the combined signals to the antenna input of a radio;

wherein the tuner provides audio from both a decoded SAP carrier and from a TV audio signal and further comprising an audio multiplexer for selecting between TV audio and SAP audio and for further providing a beep signal, the audio multiplexer including a first input, a second input, an output, a first resistor having a first and a second terminal, a second resistor having a first and a second terminal, a third resistor having a first and a second terminal, and a fourth resistor having a first and a second terminal;

the first terminal of the first resistor coupled to the first input, the second terminal of the first resistor coupled to the first terminal of the second resistor; the first terminal of the third resistor coupled to the second input, the second terminal of the third resistor coupled to the first terminal of the fourth resistor, and the second terminal of the second resistor coupled to the second terminal of the fourth resistor and to the output; and control means coupled to the second terminals of the first and third resistors for selectively grounding those terminals, floating those terminals, or for toggling those terminals from a digital high to a ground at an audio frequency.

14. Apparatus for selectively monitoring a broadcast signal in response to the decoding of a five tone sequence, the apparatus including a decoder for monitoring the broadcast signal for the five tone sequence, wherein each tone is characterized by a musical note commonly associated with the tone, a frequency, a duration, and a time from the start of the tone to the start of the next tone as follows:

|   | Tone | Frequency | Duration | Time from start of tone to start of next tone |
|---|------|-----------|----------|-----------------------------------------------|
| 1. | E3   | 329 hz    | 76 ms    | 120 ms |
| 2. | B4   | 493 hz    | 73 ms    | 104 ms |
| 3. | E4   | 658 hz    | 108 ms   | 200 ms |
| 4. | G#3  | 415 hz    | 74 ms    | 105 ms |
| 5. | C#4  | 550 hz    | 135 ms   |        |

15. An integrated tuner comprising:

connector means for coupling to the antenna of an automobile:

a first tuner coupled to the connector means for tuning and demodulating broadcast audio signals received by said connector means;

a second tuner coupled to the connector means for tuning and demodulating broadcast audio signals received by said connector means;

means for selecting an identification code in response to user inputs;

detector means coupled to the first tuner for monitoring the broadcast tuned by the first tuner and for detecting a fixed tone sequence followed by the selected identification code;

output means for providing an output audio signal;

a multiplexer coupled to receive the demodulated signals from the first and second tuners, said multiplexer coupling the signal from the second tuner to the output means until detection of the fixed tone sequence followed by the selected identification code, coupling the output from the first tuner to the output means in response to the detection, and subsequently recoupling the output of the second tuner to the output means without further input from the user.

16. An integrated tuner as in claim 15 wherein the first tuner demodulates the audio on a SAP carrier of a TV broadcast.

17. An integrated tuner comprising:

connector means for coupling to the antenna of an automobile;

a first tuner coupled to the connector means for tuning and demodulating broadcast audio signals received by said connector means;

a second tuner coupled to the connector means for tuning and demodulating broadcast audio signals received by said connector means;

means for selecting an identification code in response to user inputs;

detector means coupled to the first tuner for monitoring the broadcast tuned by the first tuner and for detecting a fixed tone sequence followed by the selected identification code;

output means for providing an output audio signal;

a multiplexer coupled to receive the demodulated signals from the first and second tuners, said multiplexer coupling the signal from the second tuner to the output means until detection of the fixed tone sequence followed by the selected identification code, coupling the output from the first tuner to the output means in response to the detection, and subsequently recoupling the output of the second tuner to the output means without further input from the user;

wherein the fixed tone sequence is a five tone sequence, wherein each tone is characterized by a musical note commonly associated with the tone, a frequency, a duration, and a time from the start of the tone to the start of the next tone as follows:

|   | Tone | Frequency | Duration | Time from start of tone to start of next tone |
|---|------|-----------|----------|-----------------------------------------------|
| 1. | E3   | 329 hz    | 76 ms    | 120 ms |
| 2. | B4   | 493 hz    | 73 ms    | 104 ms |
| 3. | E4   | 658 hz    | 108 ms   | 200 ms |
| 4. | G#3  | 415 hz    | 74 ms    | 105 ms |
| 5. | C#4  | 550 hz    | 135 ms   |        |

18. An integrated tuner comprising:

connector means for coupling to the antenna of an automobile;

a first tuner coupled to the connector means for tuning and demodulating broadcast audio signals received by said connector means;

a second tuner coupled to the connector means for tuning and demodulating broadcast audio signals received by said connector means;

means for selecting an identification code in response to user inputs;

detector means coupled to the first tuner for monitoring the broadcast tuned by the first tuner and for detecting a fixed tone sequence followed by the selected identification code;

output means for providing an output audio signal;

a multiplexer coupled to receive the demodulated signals from the first and second tuners, said multiplexer coupling the signal from the second tuner to the output means until detection of the fixed tone sequence followed by the selected identification code, coupling the output from the first tuner to the output means in response to the detection, and subsequently recoupling the output of the second tuner to the output means without further input from the user;

further comprising means for detecting a duration code subsequent to the detection of the fixed tone sequence wherein the multiplexor recouples the output from the second tuner to the output means after a period of time determined in response to the duration code.

* * * * *